United States Patent [19]

Flachbarth et al.

[11] 4,015,397
[45] Apr. 5, 1977

[54] SERVICE POLES AND ACCESSORIES

[75] Inventors: Charles T. Flachbarth; John L. Myers, both of Parkersburg, W. Va.

[73] Assignee: Textron, Inc., Providence, R.I.

[22] Filed: Apr. 28, 1975

[21] Appl. No.: 572,466

Related U.S. Application Data

[62] Division of Ser. No. 464,803, Apr. 29, 1974, U.S. Pat. No. 3,889,044.

[52] U.S. Cl. .................... 52/713; 52/221; 52/484; 52/721; 248/188.4; 248/357
[51] Int. Cl.² .......................... E04B 1/38
[58] Field of Search ......... 138/103; 220/3.92, 3.94; 174/48, 49; 52/220, 221, 484, 721, 758 A, 713; 248/226 R, 188.4, 357

[56] References Cited

UNITED STATES PATENTS

| | | | |
|---|---|---|---|
| 1,982,502 | 11/1934 | Douglas | 220/3.94 |
| 2,265,926 | 12/1941 | Pike | 220/3.94 |
| 3,082,290 | 3/1963 | Ohmit | 174/49 |
| 3,240,455 | 3/1966 | Swezy et al. | 248/226 R |
| 3,243,153 | 3/1966 | Kelly et al. | 248/226 R |
| 3,534,319 | 10/1970 | Queirolo et al. | 174/48 |
| 3,565,501 | 2/1971 | Bowen et al. | 248/188.4 |
| 3,609,211 | 9/1971 | Van Herk | 174/49 |
| 3,742,662 | 7/1973 | Ballou | 248/188.4 |
| 3,889,044 | 6/1975 | Flachbarth | 220/3.94 |

*Primary Examiner*—Harry N. Haroian
*Assistant Examiner*—L. Footland
*Attorney, Agent, or Firm*—Frederick J. Olsson

[57] ABSTRACT

A power-telephone service pole having a cover which is removable simply by being pried off when the pole is installed so that the telephone compartment is readily available and having a T-bar/tie-rod hanger and a power junction box which cooperate with the removable cover to permit the pole to be quickly installed or relocated together with a pedestal adapting the pole alternately for use on tile or on carpet and for being spotted in position by means of floor studs or screws.

6 Claims, 10 Drawing Figures

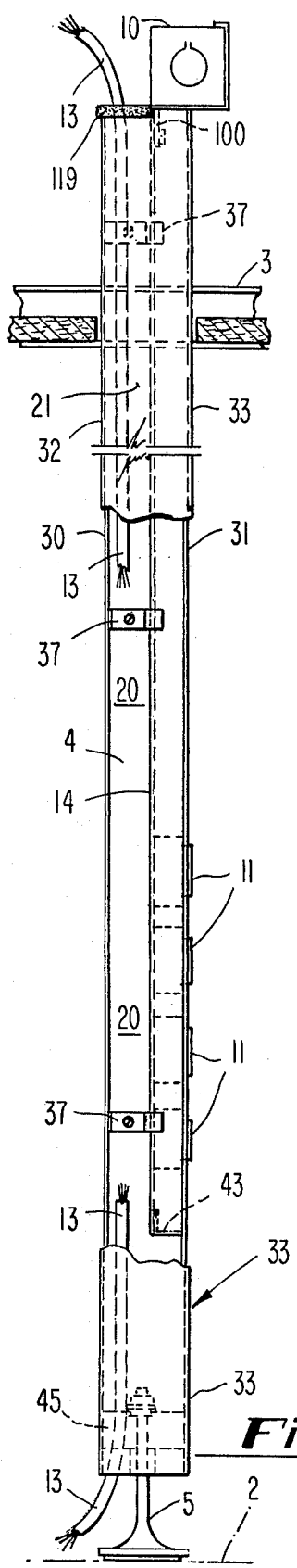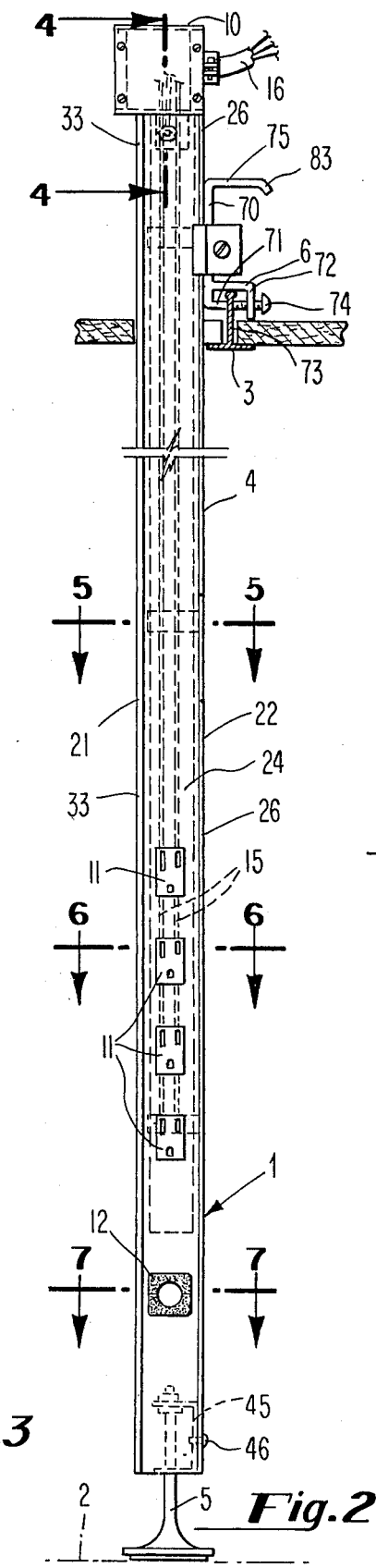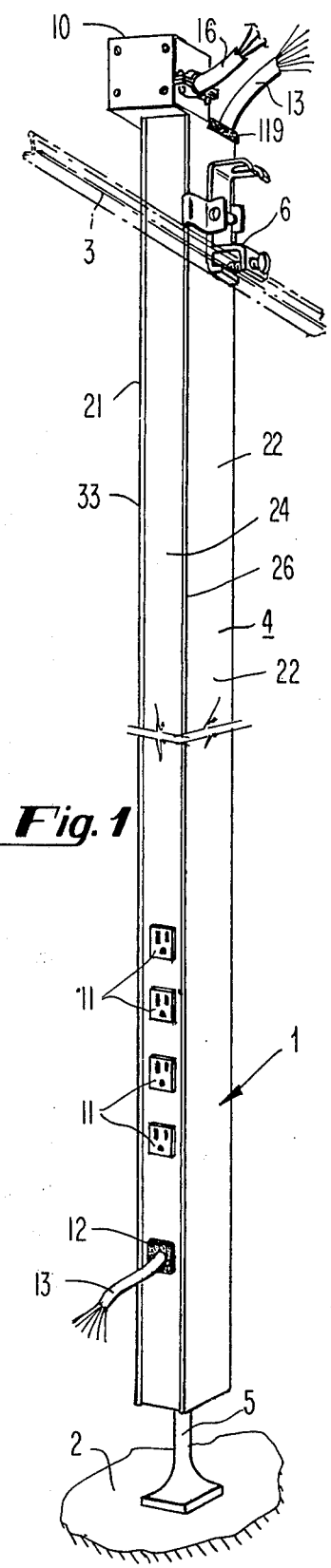

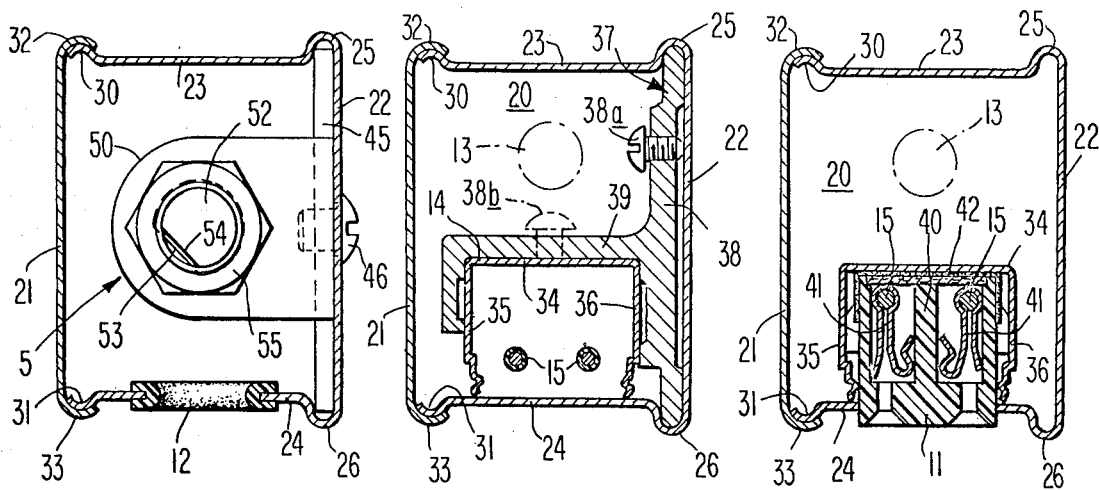
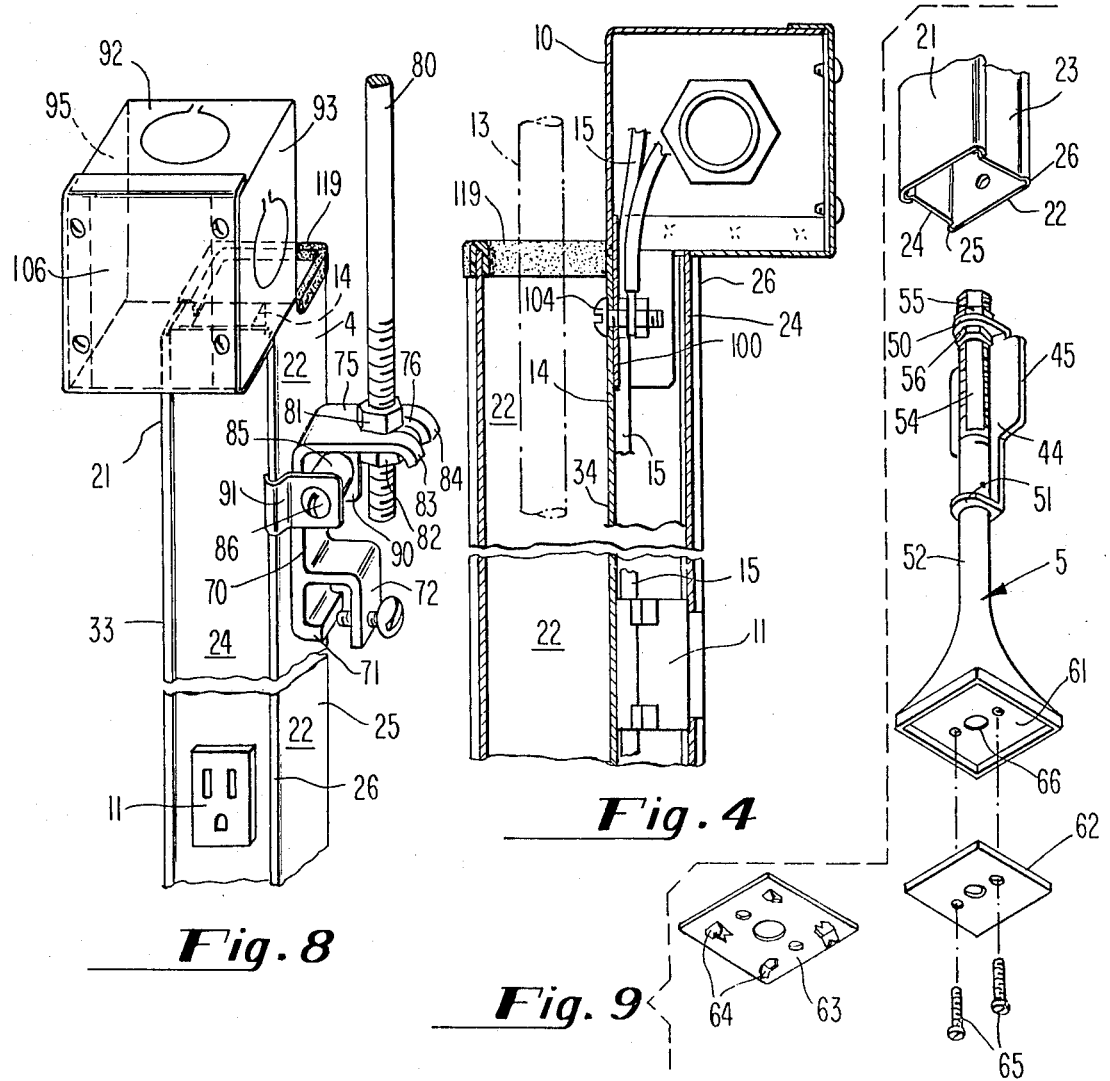

SERVICE POLES AND ACCESSORIES

This application is a division of our co-pending application Ser. No. 464,803 filed Apr. 29, 1974 and entitled SERVICE POLES now U.S. Pat. No. 3,899,044 issued June 10, 1975.

This invention relates to electrical and communication distribution systems in buildings or the like and in particular relates to a pole to provide power and/or telephone service.

One of the objects of the invention is to provide a service pole made of components of simplified construction which are fabricated as by roll forming and/or by extrusion and thereby reduce manufacturing costs.

Another object of the invention is to provide a service pole having major components formed by extrusion and roll forming which easily slide together and are held by a minimum of fasteners to thereby reduce pole fabrication and assembly costs.

Another object of the invention is to provide a service pole including C-shaped, roll formed, inner and outer housings held together by an extruded retainer, for assembly, the retainer being adapted to slide into the outer housing and the inner housing being adapted to slide into the retainer, the sliding arrangement minimizing assembly costs.

Another object of the invention is to provide a service pole having a hanger made from an extrusion which provides means alternatively usable to connect the hanger to a T-bar to a tie rod.

Another object of the invention is to provide a service pole having a cover which can be easily removed (or replaced) while the pole is installed so as to provide access to the telephone compartment for service or disconnecting.

Another object of the invention is to provide a service pole with a removable cover, a hanger and a power junction box which cooperate to permit quick connect and disconnect so that the pole can be rapidly installed and relocated.

Another object of the invention is to provide a service pole having a supporting pedestal which provides for quick vertical adjustment and which is adaptable for use on both carpet and tile and for use in locating the pole by floor-installed studs or screws.

Other objects and various advantages of the invention will be apparent from the following description taken in conjunction with the drawings wherein.

FIG. 1 is a perspective view of a pole constructed in accordance with the invention;

FIG. 2 is a side elevational view of the pole of FIG. 1;

FIG. 3 is a side elevational view of the pole of FIG. 1 with the cover partially removed;

FIG. 4 is an elevational view taken along the lines 4—4 of FIG. 2;

FIG. 5 is a plan view taken along the lines 5—5 of FIG. 2;

FIG. 6 is a plan view taken along the lines 6—6 of FIG. 2;

FIG. 7 is a plan view taken along the lines 7—7 of FIG. 2;

FIG. 8 is a fragmentary, perspective view of the top of the pole showing the power junction box and the T-bar/tie-rod hanger.

FIG. 9 is an exploded view of the pedestal which supports the pole;

Figure 10:
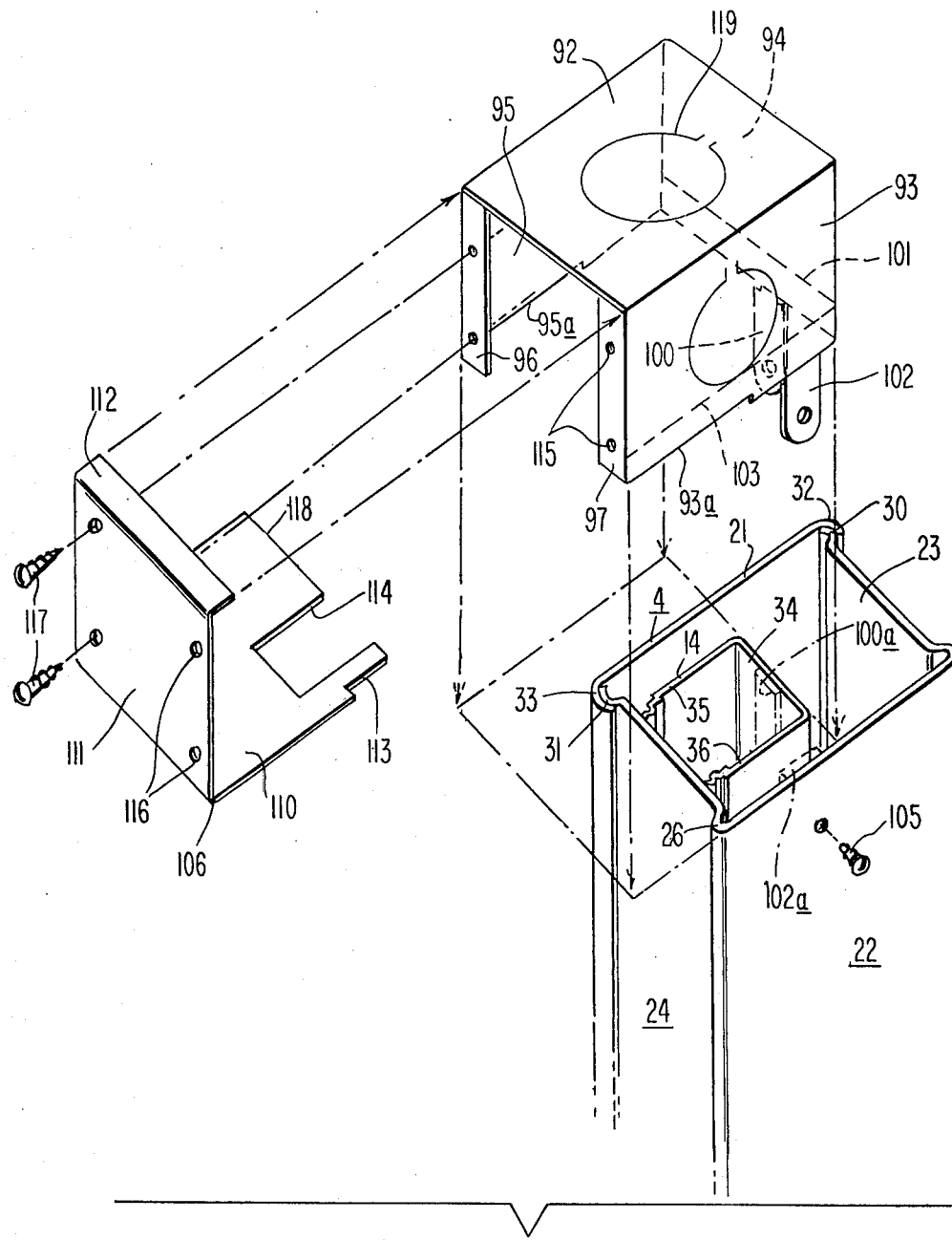
FIG. 10 is an exploded view of the top of the pole and the power junction box.

In FIG. 1 the pole 1 extends between the floor 2 and a suspended ceiling a T-bar which is indicated at 3.

The pole includes the outer housing 4, the support pedestal 5, the hanger 6, the power junction box 10, the power receptacles 11 and the telephone outlet or grommet 12 carrying the telephone cable 13.

With reference to FIG. 3, the pole has an inner housing 14 which extends from the top of the outer housing 4 down partially along the full length. The inner housing 14 mounts the junction box 10 and power receptacles 11. The power conductors 15 (FIG. 2) feed the receptacles from the junction box. The conductors are joined in the junction box to the service line 16.

The inner housing 14 is smaller in cross sectional area than the outer housing 4. This provides internal space forming a telephone cable compartment 20. The telephone cable 13 (FIG. 1) extends from the top of the pole down through the compartment 20 and then outwardly either through the grommet 12 (FIG. 1) or down and out at the bottom as indicated in FIG. 3. The inner housing 14 isolates the power conductors and receptacles from the telephone compartment.

The outer housing 4 has a cover 21 (FIG. 3) which extends the full length of the housing and can be removed to make the compartment 20 accessible. An important feature is that none of the above mentioned components offer interference to the cover being pried off and then replaced while the pole is installed.

The details of construction on the various components mentioned above will next be described.

The cross sectional shape of the outer housing 20 is best seen in FIGS. 5, 6 and 7. The housing is C-shaped having a flat base 22 and a pair of side walls 23 and 24. The joinder areas between the base and the side wall are formed with outwardly extending pockets 25 and 26. These pockets are coextensive with the length of the housing.

The outer edges of the sides 23 and 24 are offset as indicated at 30 and 31. These offsets extend the full length of the housing. As noted, the cover 21 extends over the open side of the housing. The edges 32 and 33 of the cover are contoured to fit the offsets 30 and 31. The dimensions are such that the cover can be snapped into place and then pried off.

The cover is best pried off by pulling one edge away from the housing edge at the bottom and running the blade of a screw driver up between the cover edge and housing edge.

The above described shape of the outer housing 4 and cover 21 are such that the same are readily adaptable to fabrication either by roll forming or by extrusion.

The inner housing 14 is likewise C-shaped having a base 34 and two sides 35 and 36. The open side of the housing is closed off by the side 24 of the outer housing. As noted in FIG. 5, the cross sectional area of the inner housing 14 is smaller than the cross sectional area of the outer housing 4 and this difference in area provides the space forming the telephone compartment 20.

The inner housing 14 is supported by a plurality of retainers 37 the general shape of which is best shown in FIG. 5. The retainer includes a base 38 and a socket 39 which envelops the inner housing 14. As noted, the base 38 extends out into the pockets 25 and 26. The screw 38a when tightened down wedges the base against the pockets. The retainers are fabricated by extruding a blank of the cross sectional shape shown and then cutting sections from the blank.

As noted in FIG. 3, there are three retainers 37 spaced along the outer housing 4 to retain the inner housing 14 in the position as shown in FIG. 5. The inner housing 14 is retained in a vertical direction by being fastened to the junction box 10 which in turn rests on and is fixed to the outer housing 4 as will be explained later. Where a junction box of the structure of box 10 is not used, the inner housing 14 can be retained by set screws in the retainers such as the set screw indicated by the dotted lines 38b in FIG. 5 which preferably has a tapered end to bite into the base 34.

The base of each retainer makes a snug, sliding fit with the pockets 25 and 26. For assembly, the retainers are slid into the outer housing 4 and then locked into position by the set screw 38a. The inner housing 14 makes a snug, sliding fit with the socket 39 so that for assembly the inner housing 14 is slid into the sockets 39.

The sliding arrangement is highly advantageous in that it reduces assembly and fabrication time.

The receptacles 11 are supported by the inner housing. Each receptacle includes the insulated block 40 retained in the housing by wedging means not shown. The block has a cavity which supports the contacts 41 connected to the power conductors 15. The cap assembly 42 confines the contacts within the cavities. It is contemplated that the inner housing 14 be wired prior to assembly to the outer housing with the power conductors 15 and the receptacles 11. The above described receptacle structure is conventional.

As noted in FIGS. 2 and 3 the top of the housing 14 and the top of the housing 4 are flush and the inner housing extends downwardly from the top and terminates a short distance from the end of the outer housing. The lower end of the inner housing has a closure cap as indicated at 43.

From the foregoing description it will be observed that inner housing effectively isolates the power conductors and the receptacles from the telephone compartment 20.

The structure of the pedestal 5 will be described in connection with FIG. 9.

The bracket 44 is substantially flat and has a base 44' which makes a firm contact with the base 22 of the outer housing. The base of the bracket has an enlarged section 45 extending laterally into the pockets 25 and 26 which make a snug but sliding fit (see FIG. 7). This maintains the bracket against lateral movement. A screw 46 (FIGS. 2 and 7) holds the base in position against vertical movement.

The bracket includes the apertured flanges 50 and 51 which extend outwardly from the base and receive the threaded leg 49 of a foot 52 which makes a sliding fit therewith. The top flange 50 has a flat 53 (see FIG. 7) which mates with a flat 54 on the leg 52. This prevents rotation of the foot. The nuts 55 and 56 lock the leg 49 with respect to the bracket 44 and the housing 4. The vertical position of the pole can be adjusted by the location of the lower nut 56 on the leg.

The bottom of the foot has an underside cavity 61 which is adapted to hold either the tile plate 62 or the carpet plate 63.

The plate 62 is made of rubber or other resilient material so as to maintain a grip on tile. Plate 63 has prongs 64 which are adapted to grip the carpet pile to maintain position. The plate 63 may be made of metal with the prongs 64 lanced as shown or the plate may be made of polycarbonate plastic with the prongs molded in. The plates are held in the cavity by the screws 65.

In certain installations it is required to lock the bottom of the pole with a positive mechanical stop. For such applications the foot has been provided with an aperture 66 which is adapted to receive a screw or a stud driven into the floor. The plates 62 and 63 are apertured so as to accomodate the stud or screw.

It will be noted that the pole housing 4 and the base 50 are rectangular. The flats 53 and 54 align the two rectangular configurations and maintain the relationship.

For assembly, the bracket 44 and foot 52 are assembled as indicated. The bracket is slid up into the pockets 25 and 26 and the screw 46 secured in place. When the pole is finally positioned vertical adjustments are made via the nuts 55 and 56.

The structure of the bracket has several important advantages; i.e. provides space for a telephone cable to exit through the bottom of the pole; is accessible for quick vertical adjustment when the cover is removed; has simplified structure which is not only easy to fabricate by conventional tools but can be quickly assembled; attains lateral and vertical stability by its engagement with the outer housing and the use of a single screw; and has quick adaptability for either tile or carpet and for use with locator studs.

The hanger 6 which provides for the top of the pole to be anchored to a T-bar or to a ceiling tie-rod will next be described with particular reference to FIG. 8.

The base 70 is substantially flat and engages the base 22 of the outer housing. A pair of jaws 71 and 72 extend outwardlly from the bottom of the base. The jaws face one another and are spaced apart to receive the leg 73 of the T-bar 3 (FIG. 2). Screw 74 operating in the jaw 72 clamps the leg 73 against the jaw 71.

A connector flange 75 is slotted at 76 for receiving the threaded tie rod 80. The nuts 81 and 82 lock the tie rod and hanger together. The ends 83 and 84 of the flange are turned down to maintain the nut 82 in position.

The hanger includes a removable clamp. The center of the bar 70 has a raised section 85 provided with a clearance hole to receive nut-bolt assembly 86. The bolt holds a pair of S-shaped clamps 90 and 91 which respectively grip the pockets 25 and 26. The nut (not shown) is threaded on the bolt and operates against the clamp 90. When the nut and bolt are tightened, the clamp squeezes the pockets 25 and 26 and the base 70 and thereby hold the hanger in position on the outer housing.

The hanger is made by extruding a blank having the cross sectional shape indicated and then cut into sections of the proper width. The slot 76 is then formed in the flange 75.

The structure of the hanger has several distinct advantages; i.e. it is quickly removed from the T-bar on the tie-rod and from the pole and easily adjusted either up or down. This enhances the speed of installation and also minimizes the time for relocation of a pole. Moreover, it will be particularly noted that as mounted on the pole no part of the hanger offers interference to removal or replacement of the cover.

The power junction 10 at the top of the pole will next be described particularly with reference to FIG. 10.

The box includes a cubical-shaped body comprising the top 92, the three closed sides 93, 94, 95 an open side (opposite to the side 94) and an open bottom. The sides 95 and 93 carry mounting flanges 96 and 97.

The side 94 carries the tongue 100. The tongue is attached to the side by the fact that it is part of a cross piece 101 which is spot welded to the side 94. The side 93 has a downwardly extending tongue 102 which is secured to the side by the fact that it is a part of a cross piece 103 spot welded to the side 93. The tongues 100 and 102 are oriented at right angles to each other.

The box is adapted to rest on top of the housing with lower edges of the sides 93 and 95 in contact with the edge of the base 22 and the edge of the cover 21. The lower edge of the side 94 is in contact with edge of the base 34. In this position the tongue 100 extends down into the inner housing 14 in contact with the base 34 in the location indicated by the dotted lines 100a. The tongue 100 is secured to the base 34 by the nut and bolt assembly 104 (see FIG. 4). The assembly 104 also serves as a ground connection for the power conductors.

The tongue 102 extends down into the outer housing 4 in contact with the base 22 in the location as noted by the dotted lines 102a. The tongue 102 and the base 22 have clearance apertures which accept a self-tapping screw 105 which operates to lock the tongue 102 in position.

The box includes the L-shaped cover 106 having a bottom leg 110 and a vertical leg 111 capped by the flange 112. The bottom leg 110 has a cut-out section 113 which is for accommodating the tongue 102. The leg 110 has a larger cut-out section 114 which has a cross-sectional area the same as the inner housing 14.

When the body is mounted on the housing as above described, the cover 106 is moved to the right so that the leg 110 slides into the area provided by the under-cut areas 93a and 95a so that the large cut-out 114 is aligned with the open end of the inner housing. This provides a passage for power conductor from the inner housing to the junction box. The vertical leg 111 contacts the flanges 96 and 97 and the flange 112 fits over the top 92. The threaded apertures 115 in the flanges 96 and 97 are aligned with the clearance holes 116 for screws 117 to secure the cover in place. The edge 118 of the leg 110 extends inwardly so that it abuts the side 94. With the junction box 10 in place, the telephone channel 20 remains open ended. Preferably, a grommet 119 is used at the end of the channel.

The sides of the junction box are provided with appropriate knock-outs 119. Similar to the inner housing 14, the junction box isolates the power conductors from the telephone cable.

The structure of the junction box provides a ready and convenient means for connecting and disconnecting the service lines and the power conductors both from the standpoint of initial installation and subsequent relocation of the pole. For power connection, the cover is removed, the service cable attached to the box and the service cable and the power conductors are brought out of the box and secured together by wire nuts. The connected wires are then pushed back into the box and the cover secured. If the pole is to be relocated, the cover is taken off, the conductors disconnected and the service cable is disconnected from the box.

The structure of the junction box in being attached to the inner housing enhances the assembly procedure for the pole. Thus, when the inner housing is pre-wired with receptacles and power conductors, the junction box is secured with the nut and bolt assembly 104 and the power conductors brought up and into the junction box. The sub-assembly is mounted by sliding the inner housing into the retainers as previously described. The screw 105 is then used to lock the junction box to the outer housing.

As previously mentioned, the junction box rests on the top edge of the inner and outer housings and this contact together and the engagement of the bolt 104 and screw 105 provides a means to prevent the inner housing from sliding downwardly.

We claim:

1. For a service pole for supplying power and/or telephone outlets in a room and pole being adapted to extend between the floor and ceiling of the room and the ceiling being the suspended type having means for supporting panels, a pedestal comprising;
   a bracket having a base and a pair of flanges respectively connected adjacent to the top and bottom of the base and extending outwardly therefrom, the flanges being formed with aligned apertures, the aperture in one of the flanges being formed with a flat;
   a foot having a base and a threaded leg the leg extending through said aligned apertures and making a sliding therewith, and the leg having a flat engaging said aperture flat to prevent rotation of the pedestal with respect to the bracket;
   a pair of nuts threaded on said leg respectively on the top side and bottom side of one of said flanges for securing the leg to the flange;
   a cavity formed in the bottom of said base; and
   plate means mounted in said cavity for engaging the floor on which the pole is mounted.

2. For a service pole for supplying power and/or telephone outlets in a room the pole being adapted to extend between the floor and ceiling of the room and the ceiling being the suspended type having means for supporting panels, a pedestal comprising:
   a bracket having a base and a pair of flanges respectively connected adjacent to the top and bottom of the base and extending outwardly therefrom, the flanges being formed with aligned apertures, the aperture in one of the flanges being formed with a flat;
   a foot having a base and a threaded leg the leg extending through said aligned apertures and making a sliding therewith, and the leg having a flat engaging said aperture flat to prevent rotation of the pedestal with respect to the bracket;
   a pair of nuts threaded on said leg respectively on the top side and bottom side of one of said flanges for securing the leg to the flange;
   a cavity formed in the bottom of said base; and
   plate means mounted in said cavity for engaging the floor on which the pole is mounted, the plate means having a clearance aperture formed in the center thereof; and a locating aperture formed in said base and aligned with said plate aperture, the apertures being adapted to receive a locating and holding stud anchored to the floor.

3. For a service pole for supplying power and/or telephone outlets in a room, the pole being adapted to extend between the floor and ceiling of the room and the ceiling being the suspended type having means for supporting panels, a pedestal comprising:
   a bracket having a base and a pair of flanges respectively connected adjacent to the top and bottom of the base and extending outwardly therefrom, the flanges being formed with aligned apertures, the aperture in one of the flanges being formed with a flat;

a foot having a base and a threaded leg, the leg extending through said aligned apertures and making a sliding therewith, and the leg having a flat engaging said aperture flat to prevent rotation of the pedestal with respect to the bracket;

a pair of nuts threaded on said leg respectively on the top side and bottom side of one of said flanges for securing the leg to the flange;

a cavity formed in the bottom of said base;

plate means mounted in said cavity for engaging the floor on which the pole is mounted, the plate means being made of resilient material adapting the pole for use with a tile floor and the plate means having a clearance aperture formed in the center thereof; and a locating aperture formed in said base and aligned with said plate aperture, the apertures being adapted to receive a locating and holding stud anchored to the floor.

4. For a service pole for supplying power and/or telephone outlets in a room the pole being adapted to extend between the floor and ceiling of the room and the ceiling being the suspended type having means for supporting panels, a pedestal comprising:

a bracket having a base and a pair of flanges respectively connected adjacent to the top and bottom of the base and extending outwardly therefrom, the flanges being formed with aligned apertures, the aperture in one of the flanges being formed with a flat;

a foot having a base and a threaded leg the leg extending through said aligned apertures and making a sliding therewith, and the leg having a flat engaging said aperture flat to prevent rotation of the pedestal with respect to the bracket;

a pair of nuts threaded on said leg respectively on the top side and bottom side of one of said flanges for securing the leg to the flange;

a cavity formed in the bottom of said base;

plate means mounted in said cavity for engaging the floor on which the pole is mounted, the plate means having a plurality of carpet grippers extending downwardly from the bottom thereof, the grippers adapting the pole for use with a floor carpet.

5. For a service pole for supplying power and/or telephone outlets in a room, the pole being adapted to extend between the floor and the ceiling of the room and the ceiling being the suspended type having inverted T-bar members for supporting panels, a T-bar hanger comprising:

a base;

a pair of spaced jaws extending outwardly from the bottom of the base for receiving the leg of a T-bar therebetween, a screw threaded in one jaw and operative to engage a T-bar leg and clamp the same against the other jaw;

a connector flange extending outwardly from the top of the base and having a slot for receiving a tie rod;

a bolt support formed in said base;

a pair of grips for engaging the pole with which the hanger is used and disposed on opposite sides of said bolt support; and a nut and bolt assembly, the bolt extending through said support and through said grips, the head of the bolt engaging one grip and the nut engaging the other grip, the nut and bolt being for use in pulling the grips tight against the pole and tight against the base to thereby secure the hanger to the pole.

6. For a service pole for supplying power and/or telephone outlets in a room, the pole being adapted to extend between the floor and the ceiling of the room and the ceiling being the suspended type having inverted T-bar members for supporting panels, a T-bar and tie-rod hanger comprising:

a base;

a pair of spaced jaws extending outwardly from the bottom of the base for receiving the leg of a T-bar therebetween, a screw threaded in one jaw and operative to engage a T-bar leg and clamp the same against the other jaw;

a connector flange extending outwardly from the top of the base and having a slot for receiving a tie rod, the end of the flange being contoured for use in retaining a nut used in joining the flange to a tie-rod;

a bolt support formed in said base;

a pair of grips for engaging the pole with which the hanger is used and disposed on opposite sides of said bolt support; and a nut and bolt assembly, the bolt extending through said support and through said grips, the head of the bolt engaging one grip and the nut engaging the other grip, the nut and bolt being for use in pulling the grips tight against the pole and tight against the base to thereby secure the hanger to the pole.

* * * * *